(12) United States Patent
Liu et al.

(10) Patent No.: US 11,448,427 B2
(45) Date of Patent: Sep. 20, 2022

(54) HEAT-RECOVERY-ENHANCED REFRIGERATION SYSTEM

(71) Applicant: CARRIER CORPORATION, Palm Beach Gardens, FL (US)

(72) Inventors: Hongsheng Liu, Shanghai (CN); Parmesh Verma, South Windsor, CT (US); Frederick J. Cogswell, Glastonbury, CT (US); Yinshan Feng, Manchester, CT (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 227 days.

(21) Appl. No.: 16/779,039

(22) Filed: Jan. 31, 2020

(65) Prior Publication Data

US 2020/0248938 A1 Aug. 6, 2020

(30) Foreign Application Priority Data

Feb. 2, 2019 (CN) .......................... 201910108481.0

(51) Int. Cl.
*F25B 1/06* (2006.01)
*B60H 1/32* (2006.01)
(Continued)

(52) U.S. Cl.
CPC ............. *F25B 1/06* (2013.01); *B60H 1/3227* (2013.01); *B60H 1/32281* (2019.05); *F25B 7/00* (2013.01);
(Continued)

(58) Field of Classification Search
CPC ...... F25B 1/06; F25B 1/08; F25B 7/00; F25B 40/00; F25B 40/02; F25B 40/04; F25B 27/00; F25B 27/02
See application file for complete search history.

(56) References Cited

U.S. PATENT DOCUMENTS 3,602,295 A * 8/1971 Klaas .................. B60H 1/3204
165/202
4,018,583 A 4/1977 Patnode et al.
(Continued)

FOREIGN PATENT DOCUMENTS

BR 0204072 A 9/2003
CN 1475716 A 2/2004
(Continued)

OTHER PUBLICATIONS

European Office Action; European Application No. 17826053.5; dated Sep. 20, 2021; 8 pages.
(Continued)

*Primary Examiner* — Christopher R Zerphey
(74) *Attorney, Agent, or Firm* — Cantor Colburn LLP

(57) ABSTRACT

A refrigerated system includes a vapor compression system defining a refrigerant flow path and a heat recovery system defining a heat recovery fluid flow path. The heat recovery system is thermally coupled to the vapor compression system. The heat recovery system includes a first heat exchanger within which heat is transferred between a heat recovery fluid and an engine coolant and at least one recovery heat exchanger positioned along the heat recovery fluid flow path directly upstream from the first heat exchanger.

15 Claims, 4 Drawing Sheets

(51) Int. Cl.
*F25B 7/00* (2006.01)
*F25B 9/08* (2006.01)
*F25B 27/02* (2006.01)
*F25B 31/00* (2006.01)
*F25B 39/02* (2006.01)
*F25B 39/04* (2006.01)
*F25B 40/02* (2006.01)
*F25B 40/04* (2006.01)

(52) U.S. Cl.
CPC .............. *F25B 9/08* (2013.01); *F25B 27/02* (2013.01); *F25B 31/006* (2013.01); *F25B 39/02* (2013.01); *F25B 39/04* (2013.01); *F25B 40/02* (2013.01); *F25B 40/04* (2013.01)

(56) References Cited

U.S. PATENT DOCUMENTS

| | | | |
|---|---|---|---|
| 4,523,437 A * | 6/1985 | Briley | F24F 5/0046 62/238.4 |
| 4,761,970 A * | 8/1988 | MacCracken | F25B 1/08 62/500 |
| 6,422,308 B1 | 7/2002 | Okawara et al. | |
| 6,477,857 B2 | 11/2002 | Takeuchi et al. | |
| 6,722,147 B2 | 4/2004 | Heyl et al. | |
| 6,782,713 B2 | 8/2004 | Takeuchi et al. | |
| 6,834,514 B2 | 12/2004 | Takeuchi et al. | |
| 6,837,069 B2 | 1/2005 | Takeuchi et al. | |
| 6,857,286 B2 | 2/2005 | Ohta et al. | |
| 6,901,765 B2 | 6/2005 | Amaral et al. | |
| 7,207,186 B2 | 4/2007 | Hirota | |
| 8,156,754 B2 | 4/2012 | Hong et al. | |
| 8,713,962 B2 | 5/2014 | Okazaki | |
| 9,200,820 B2 | 12/2015 | Okazaki et al. | |
| 9,217,590 B2 | 12/2015 | Cogswell et al. | |
| 10,059,173 B2 | 8/2018 | Lee et al. | |
| 10,094,577 B2 * | 10/2018 | Dennis | F24D 17/0015 |
| 10,655,504 B2 * | 5/2020 | Bergweiler | F25B 5/04 |
| 10,823,461 B2 | 11/2020 | Hellmann | |
| 2003/0066301 A1 | 4/2003 | Takeuchi | |
| 2004/0003608 A1 | 1/2004 | Takeuchi et al. | |
| 2004/0103685 A1 | 6/2004 | Yamaguchi et al. | |
| 2006/0254748 A1 | 11/2006 | Watanabe et al. | |
| 2007/0163293 A1 | 7/2007 | Ikegami et al. | |
| 2010/0000713 A1 | 1/2010 | Takahashi et al. | |
| 2010/0101271 A1 * | 4/2010 | Pogadaev | B60H 1/3201 62/477 |
| 2011/0289953 A1 * | 12/2011 | Alston | B60H 1/32 62/238.6 |
| 2012/0167601 A1 | 7/2012 | Cogswell et al. | |
| 2012/0204596 A1 * | 8/2012 | Takenaka | F25B 6/04 62/510 |
| 2013/0042640 A1 | 2/2013 | Higashiiue et al. | |
| 2015/0176868 A1 | 6/2015 | Kayano et al. | |
| 2016/0001636 A1 * | 1/2016 | Terada | F25B 5/02 62/160 |
| 2016/0339766 A1 | 11/2016 | Choi et al. | |
| 2017/0159977 A1 | 6/2017 | Hellmann | |
| 2017/0197490 A1 | 7/2017 | Enomoto et al. | |
| 2017/0211850 A1 | 7/2017 | Fukushima et al. | |
| 2017/0307264 A1 * | 10/2017 | Clodic | F25B 30/02 |
| 2018/0142927 A1 | 5/2018 | Hellmann et al. | |
| 2019/0137192 A1 | 5/2019 | Gil et al. | |
| 2020/0166248 A1 * | 5/2020 | Kato | F25B 41/24 |
| 2020/0248932 A1 * | 8/2020 | Cogswell | F25B 40/04 |
| 2021/0302077 A1 | 9/2021 | Xu et al. | |

FOREIGN PATENT DOCUMENTS

| | | |
|---|---|---|
| CN | 1687676 A | 10/2005 |
| CN | 101097099 A | 1/2008 |
| CN | 101158517 A | 4/2008 |
| CN | 101403536 A | 4/2009 |
| CN | 201885295 U | 6/2011 |
| CN | 103148629 A | 6/2013 |
| CN | 103282730 A | 9/2013 |
| CN | 203857718 U | 10/2014 |
| CN | 204115293 U | 1/2015 |
| CN | 106052178 A | 10/2016 |
| CN | 205843115 U | 12/2016 |
| DE | 10061658 A1 | 9/2001 |
| DE | 10158104 A1 | 6/2003 |
| DE | 102006042788 A1 | 3/2008 |
| EP | 0149413 A2 | 7/1985 |
| EP | 1882890 A2 | 1/2008 |
| EP | 3385642 A1 | 10/2018 |
| JP | S5730674 U | 2/1982 |
| JP | 2003074992 A | 3/2003 |
| JP | 2005076914 A | 3/2005 |
| JP | 2005249315 A | 9/2005 |
| JP | 2008116124 A | 5/2008 |
| JP | 4396004 B2 | 1/2010 |
| JP | 2015004460 A | 1/2015 |
| JP | 5786481 B2 | 9/2015 |
| WO | 2008034828 A1 | 3/2008 |
| WO | 2009128271 A1 | 10/2009 |
| WO | 2012092686 A | 7/2012 |
| WO | 2013055391 A1 | 4/2013 |
| WO | 2017192302 A1 | 11/2017 |
| WO | 2018118609 A1 | 6/2018 |

OTHER PUBLICATIONS

U.S. Non-Final Office Action; U.S. Appl. No. 16/778,440, filed Jan. 31, 2020; dated Aug. 17, 2021; 41 pages.
U.S. Non-Final Office Action; U.S. Appl. No. 16/468,576, filed Jun. 11, 2019; dated Aug. 3, 2021; 29 pages.
First Office Action; Chinese Patent Application No. 201611189521.1; International Filing Date: Dec. 21, 2016; dated Nov. 3, 2020; 13 pages with translation.
Indian Office Action; International Application No. 201917025804; International Filing Date: Jun. 28, 2019; dated Sep. 30, 2020; 5 pages.
C. Pollerberg et al.; "Experimental Study on the Performance of a Solar Driven Steam Jet Ejector Chiller"; Energy Conversion and Management, 49; 2008; pp. 3318-3325.
International Preliminary Report on Patentability; International Application No. PCT/US2017/066264; International Filing Date: Dec. 14, 2017; dated Jun. 25, 2019; 8 pages.
International Search Report; International Application No. PCT/US2017/066264; International Filing Date: Dec. 14, 2017; dated Mar. 22, 2018; 5 pages.
Written Opinion; International Application No. PCT/US2017/066264; International Filing Date: Dec. 14, 2017; dated Mar. 22, 2018; 6 pages.
Chinese Office Action for Application No. 201611189521.1; dated Apr. 26, 2021; 8 Pages.
Communication pursuant to Article 94(3) EPC; International Application No. 20155172.8-1002; International Filing Date: Feb. 3, 2020; dated May 3, 2021; 5 pages.
Extended European Search Report; International Application No. 20155169.4-1008; International Filing Date: Feb. 3, 2020; dated Jun. 5, 2020; 127 pages.
Extended European Search Report; International Application No. 20155172.8-1008; International Filing Date: Feb. 3, 2020; dated Apr. 1, 2020; 7 pages.
European Office Action; European Application No. 20155169.4; dated Jan. 27, 2022; 5 pages.

* cited by examiner

HEAT-RECOVERY-ENHANCED REFRIGERATION SYSTEM

CROSS-REFERENCE TO RELATED APPLICATIONS

This application claims the benefit of Chinese Application No. 201910108481.0 filed Feb. 2, 2019, the disclosure of which is incorporated herein by reference in its entirety.

BACKGROUND

Embodiments of the present disclosure relate to refrigeration systems, and more particularly, to heat recovery refrigeration systems, such as refrigerated transport systems.

A transport refrigeration system used to control an enclosed area, such as the box of a truck, trailer, intermodal container, or the like, functions by absorbing heat from the enclosed area and releasing heat outside of the box into the environment. A number of transport refrigeration units, including units currently sold by the assignee, employ a compressor to pressurize refrigerant to enable removal of heat from the box.

A number of systems power the vapor compression system via an internal combustion engine. Some systems directly couple the engine to the compressor to mechanically drive the compressor. Others electrically power the compressor via a generator. When an engine is present, a number of systems have been proposed to use heat recovery from the engine.

BRIEF DESCRIPTION

According to an embodiment, a refrigerated system includes a vapor compression system defining a refrigerant flow path and a heat recovery system defining a heat recovery fluid flow path. The heat recovery system is thermally coupled to the vapor compression system. The heat recovery system includes a first heat exchanger within which heat is transferred between a heat recovery fluid and an engine coolant and at least one recovery heat exchanger positioned along the heat recovery fluid flow path directly upstream from the first heat exchanger.

In addition to one or more of the features described above, or as an alternative, in further embodiments the heat recovery fluid flow system further comprises a primary fluid loop and a secondary fluid loop, the first heat exchanger and the at least one recovery heat exchanger being positioned along the primary fluid loop.

In addition to one or more of the features described above, or as an alternative, in further embodiments the secondary fluid loop is thermally coupled to the vapor compression system.

In addition to one or more of the features described above, or as an alternative, in further embodiments the heat recovery system further comprises a pump located upstream from the first heat exchanger, an ejector having a primary inlet and a secondary inlet, and a heat rejection heat exchanger arranged downstream from the ejector.

In addition to one or more of the features described above, or as an alternative, in further embodiments heat recovery fluid is provided to the at least one recovery heat exchanger from the pump.

In addition to one or more of the features described above, or as an alternative, in further embodiments the heat recovery system and the vapor compression system are thermally coupled at the at least one recovery heat exchanger.

In addition to one or more of the features described above, or as an alternative, in further embodiments the refrigerant of the vapor compression system provided to the at least one recovery heat exchanger has a temperature above an outside ambient temperature.

In addition to one or more of the features described above, or as an alternative, in further embodiments the vapor compression system includes a compressor, and the refrigerant discharged from the compressor is provided to the at least one recovery heat exchanger.

In addition to one or more of the features described above, or as an alternative, in further embodiments heat recovery fluid from a first portion of the heat recovery fluid flow path and heat recovery fluid from a second portion of the heat recovery fluid flow path are thermally coupled at the at least one recovery heat exchanger.

In addition to one or more of the features described above, or as an alternative, in further embodiments the first portion of the heat recovery fluid flow path is arranged at an outlet of the ejector, and the second portion of the heat recovery flow path is arranged at an outlet of the pump.

In addition to one or more of the features described above, or as an alternative, in further embodiments a first portion of the heat recovery fluid output from the heat rejection heat exchanger is provided to the primary fluid loop and a second portion of the heat recovery fluid output from the heat rejection heat exchanger is provided to the secondary fluid loop.

In addition to one or more of the features described above, or as an alternative, in further embodiments the second portion of the heat recovery fluid is provided to the secondary inlet of the ejector.

In addition to one or more of the features described above, or as an alternative, in further embodiments the at least one recovery heat exchanger includes a first recovery heat exchanger and a second recovery heat exchanger arranged in series with respect to the heat recovery fluid flow path.

In addition to one or more of the features described above, or as an alternative, in further embodiments the refrigerated system is part of a refrigerated compartment of a refrigerated transport system, the refrigerated compartment being arranged in thermal communication with the second heat exchanger of the vapor compression system.

According to another embodiment, a method of operating a transport refrigeration system including a vapor compression system and a heat recovery system includes circulating a refrigerant through a vapor compression flow path of the vapor compression system, and circulating a heat recovery fluid through a heat recovery fluid flow path of the heat recovery system. The heat recovery system includes a heat exchanger for transferring heat between a heat recovery fluid within the heat recovery fluid flow path and an engine coolant. The method additionally includes transferring heat to the heat recovery fluid within the heat recovery fluid flow path at a location upstream from the heat exchanger.

In addition to one or more of the features described above, or as an alternative, in further embodiments transferring heat to the heat recovery fluid within the heat recovery fluid flow path at a location upstream from the heat exchanger includes providing the heat recovery fluid to another heat exchanger within which the heat recovery fluid is in a heat exchange relationship with a secondary fluid.

In addition to one or more of the features described above, or as an alternative, in further embodiments the secondary fluid arranged in a heat exchange relationship with the heat recovery fluid has a temperature greater than an outside ambient temperature.

In addition to one or more of the features described above, or as an alternative, in further embodiments the secondary fluid is the refrigerant from the vapor compression system.

In addition to one or more of the features described above, or as an alternative, in further embodiments the secondary fluid is refrigerant at an outlet of a compressor of the vapor compression system.

In addition to one or more of the features described above, or as an alternative, in further embodiments the secondary fluid is the heat recovery fluid from another portion of the heat recovery fluid within the heat recovery fluid flow path.

In addition to one or more of the features described above, or as an alternative, in further embodiments the secondary fluid is refrigerant at an outlet of an ejector of a heat recovery system.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

Figure 1:
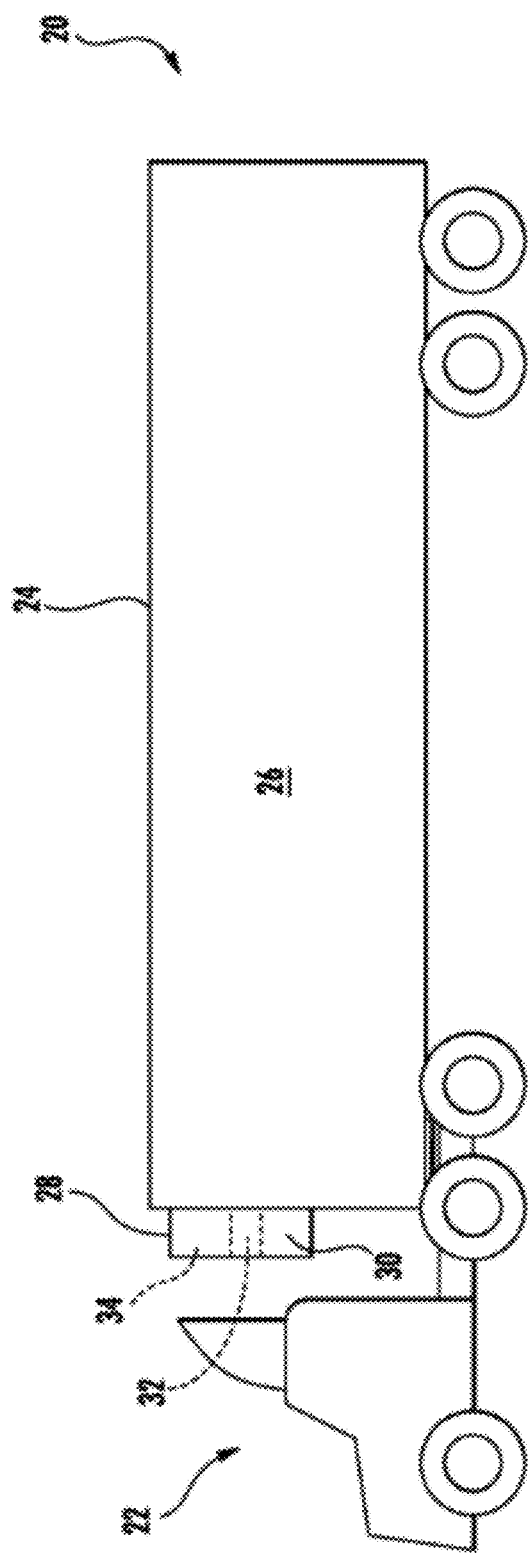
FIG. 1 is an example of a transport refrigeration system.

With reference now to FIG. 1, an example of a refrigerated transport system 20 in the form of a refrigerated trailer is illustrated. As shown, the trailer may be pulled by a tractor 22. The trailer includes a box 24 defining an interior compartment 26. An equipment housing 28 mounted to a front of the box 24 may contain an electric generator system including an engine 30 (e.g. diesel) and an electric generator 32 mechanically coupled to the engine to be driven thereby. A refrigeration system 34 may be electrically coupled to the electric generator 32 to receive electrical power.

Figure 2:
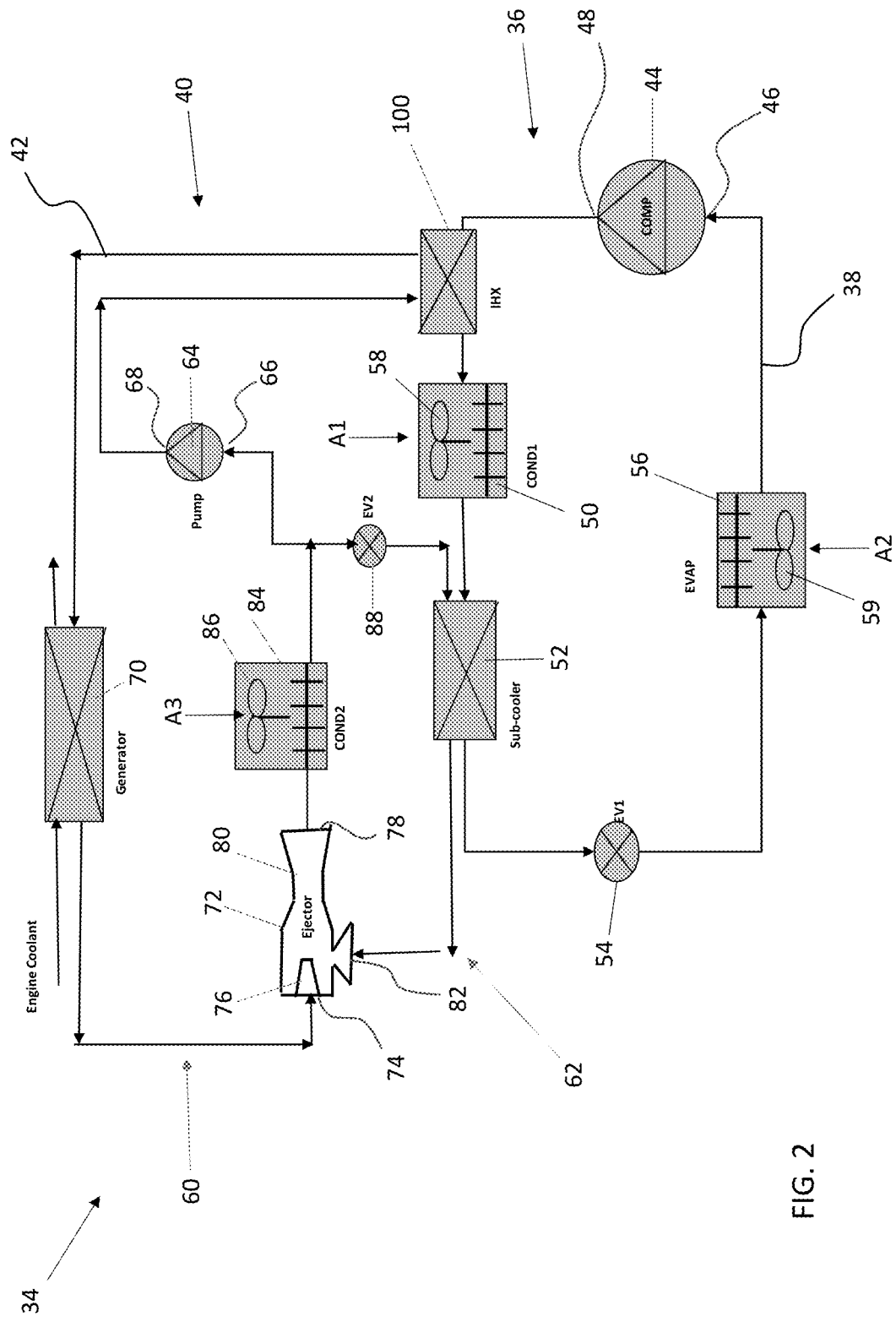
FIG. 2 is a schematic diagram of a refrigeration system of a transport refrigeration system according to an embodiment.
Figure 3:
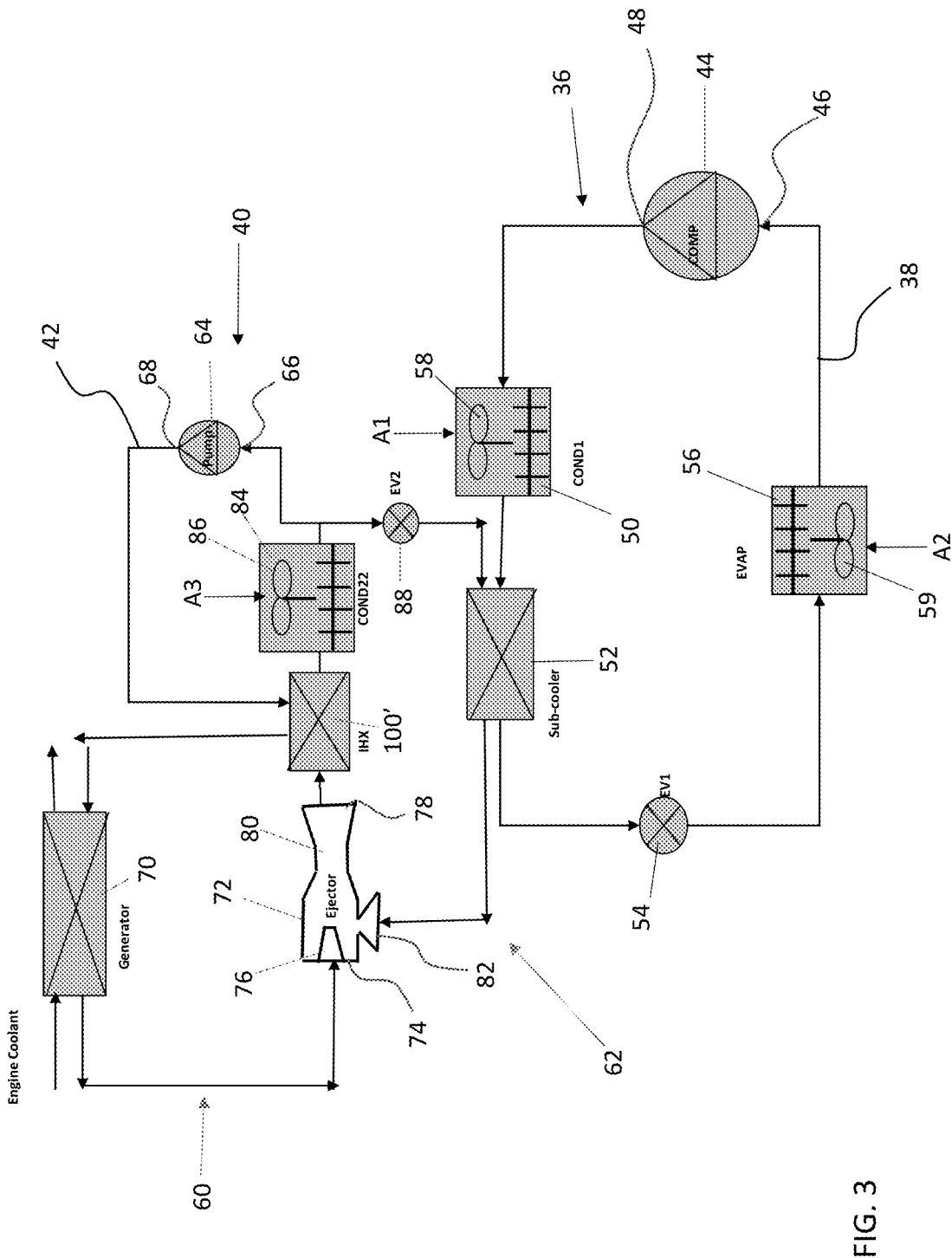
FIG. 3 is a schematic diagram of a refrigeration system of a transport refrigeration system according to an embodiment.
Figure 4:
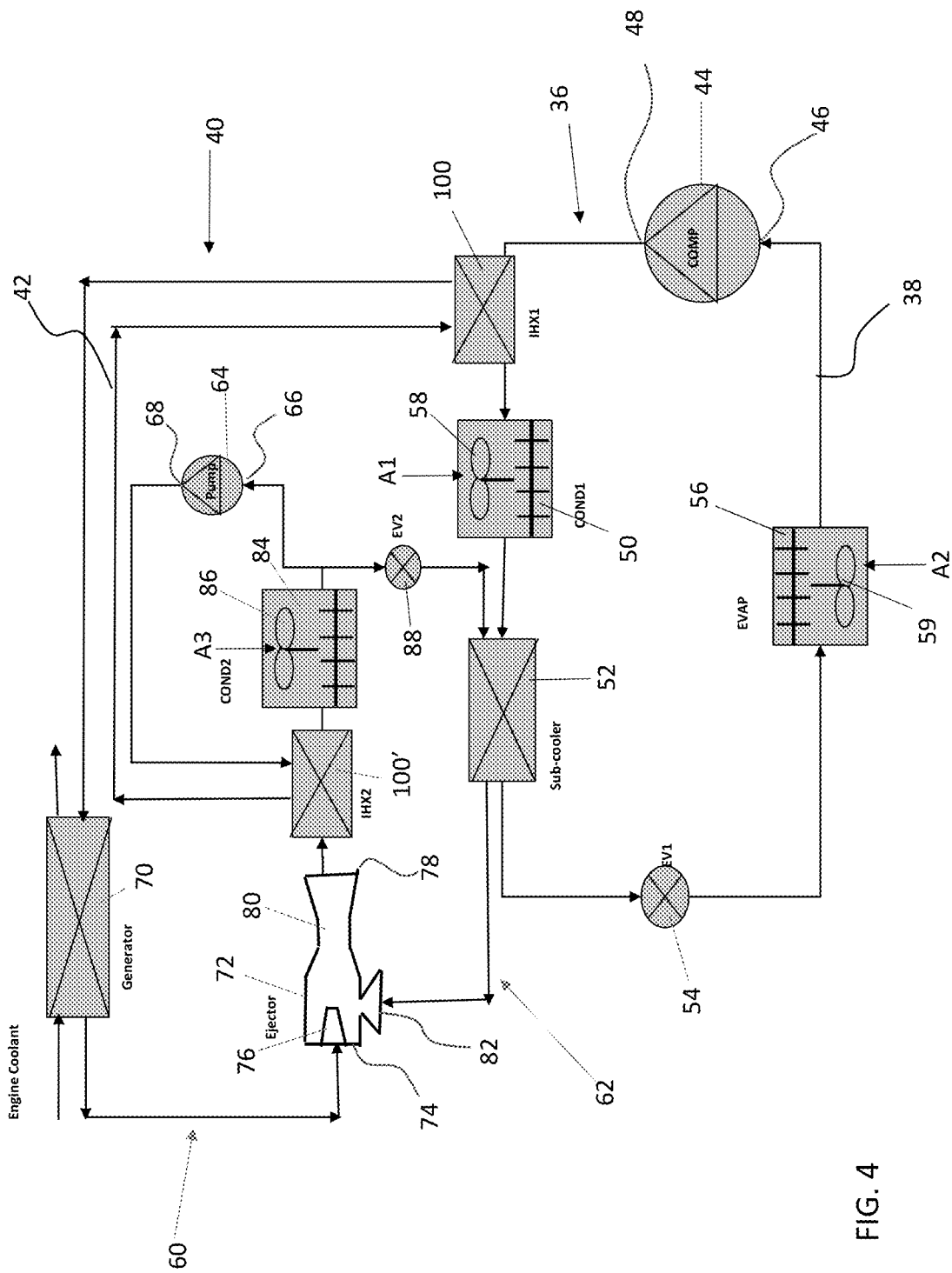
FIG. 4 is a schematic diagram of a refrigeration system of a transport refrigeration system according to an embodiment.

With reference now to FIGS. 2-4, various configurations of the refrigeration system 34 according to an embodiment are shown in more detail. The refrigeration system 34 includes a vapor compression system 36 having a refrigerant flow path 38 and a heat recovery system 40 having a recover heat recovery fluid flow path 42. The refrigeration system 34 includes a compressor 44 having a suction inlet 46 and a discharge outlet 48. In an embodiment, the compressor 44 is an electrically powered compressor having an integral electric motor. Downstream from the discharge outlet 48, the vapor compression system 36 further includes a heat exchanger 50, at least one pass through a first portion of a subcooler 52, an expansion device 54, and another heat exchanger 56. It should be understood that embodiments including a transcritical vapor compression system are also within the scope of the disclosure.

During normal operation of the vapor compression system 36, the heat exchanger 50 is a heat rejection heat exchanger, i.e. a condenser or gas cooler, and the heat exchanger 56 is a heat absorption heat exchanger, i.e. an evaporator. In the illustrated, non-limiting embodiment, both heat exchangers 50, 56 are refrigerant-air heat exchangers having a fan 58, 59 driving a respective airflow A1, A2 across each heat exchanger 50, 56. The heat exchanger 56 is arranged in communication with the interior compartment 26 of the box 24. Accordingly, the air A2 that is cooled as it flows across the heat exchanger 56 is provided to cool the interior compartment 26 of the box 24. The heat exchanger 50 is in thermal communication with an exterior of the box 24 such that heat from the refrigerant within the heat exchanger 50 is rejected to the airflow A1.

As will be discussed in more detail below, the subcooler 52 is a refrigerant-refrigerant heat exchanger where a first portion of the heat exchanger is arranged within the refrigerant flow path 38 and a second portion of the heat exchanger is arranged within the heat recovery fluid flow path 42. The heat recovery fluid flowing through the second portion of the subcooler 52 may experience a phase change and/or may be a refrigerant. However, for clarity, the fluid circulating through the heat recovery system 40 will be referred to herein as a heat recovery fluid. The heat recovery fluid and the refrigerant may have identical compositions, or alternatively, may be different.

The heat recovery fluid flow path 42 of the heat recovery system 40 includes both a primary fluid loop 60 and a secondary fluid loop 62. The primary fluid loop 60 includes a pump 64 having an inlet 66 and an outlet 68. The primary fluid loop 60 of the heat recovery system 40 additionally includes at least one pass through a first portion of a heat exchanger 70 and an ejector 72. The ejector 72 has a primary or motive flow inlet 74 at the inlet of a nozzle 76 (e.g. a convergent-divergent nozzle) and an outlet 78 at the downstream end of a diffuser 80. The ejector 72 additionally includes a secondary suction port 82. Sequentially, along the primary fluid loop 60 of the heat recovery fluid flow path 42 proceeding downstream from the pump 64 during normal operation, the heat recovery fluid passes through the heat exchanger 70, the primary inlet 74 of the ejector 72, the ejector outlet 78, and another heat exchanger 84 before returning to the pump 64. In the illustrated, non-limiting embodiment, the heat exchanger 84 is a refrigerant-air heat exchanger having a fan 86 driving a respective airflow A3 across the heat exchanger 84.

In the non-limiting embodiment illustrated in FIG. 2, the secondary fluid loop 62 is fluidly coupled to the primary fluid loop downstream from the heat exchanger 84. As shown, a first portion of the heat recovery fluid output from the heat exchanger 84 is directed to the pump 64 and a second portion of the heat recovery fluid output from the heat exchanger 84 is provided to the secondary fluid loop 62. Within this secondary fluid loop 62, the heat recovery fluid passes sequentially through an expansion device 88 and the second portion of the subcooler 52 before being returned to the primary fluid loop 60 of the heat recovery system 40 via the secondary suction port 82 of the ejector 72.

In an embodiment, the heat exchanger 70 is a generator heat exchanger configured to transfer heat from the engine of the tractor 22 to the heat recovery fluid within the primary fluid loop 60. Similarly, the heat exchanger 84 is a heat rejection heat exchanger. The second portion of the subcooler 52 serves as an evaporator or heat absorption heat exchanger, such that the heat recovery fluid within the second portion of the subcooler 52 absorbs heat from the refrigerant within the first portion of the subcooler 52.

It is desirable to increase the temperature of the heat recovery fluid provided to the heat exchanger 70 as is reduces the amount of recovery heat required for a given benefit to the vapor compression system 36, or conversely, it allows for an increased benefit to the vapor compression system 36 for a given amount of recovery heat. With reference now to FIGS. 2-4, various components within the refrigeration system 34 may be used to increase the temperature of the heat recovery fluid provided to the heat exchanger 70. More specifically, any portion of the fluid within either the heat recovery fluid flow path 42 or the refrigerant flow path 38 having a temperature above a condensing temperature thereof may be used to increase the temperature of the heat recovery fluid upstream from the heat exchanger 70.

In an embodiment, best shown in FIG. 2, the refrigeration system 34 may additionally include a heat exchanger 100 configured to heat the heat recovery fluid upstream from the heat exchanger 70. As shown, the heat exchanger 100 is a refrigerant-refrigerant heat exchanger where a first portion of the heat exchanger 100 is arranged within the refrigerant flow path 38 and a second portion of the heat exchanger is arranged within the primary fluid loop 60 of the heat recovery fluid flow path 42. With respect to the refrigerant flow path 38, the heat exchanger 100 may be positioned downstream from the discharge outlet 48 of the compressor 44 and upstream from the condensing heat exchanger 50. In the illustrated, non-limiting embodiment, the heat exchanger 100 is arranged in line with the heat exchanger 50 and the subcooler 52. Similarly, the heat exchanger 100 is arranged downstream from the pump outlet 68 and upstream from the heat exchanger 70 with respect to the flow of the heat recovery fluid through the primary flow loop 60.

In an embodiment, the heat exchanger 100 is located directly upstream from the heat exchanger 70 such that the heat recovery fluid does not pass through any additional system components, except for possibly a conduit, between the heat exchanger 100 and the heat exchanger 70. Accordingly, within the heat exchanger 100, heat is transferred from the hot vapor refrigerant output from the compressor 44 to the cooler temperature, liquid heat recovery fluid output from the pump 64. The resulting heat recovery fluid output from the heat exchanger 100 is then provided to the heat exchanger 70 to recover the engine coolant heat.

Alternatively, or in addition, the refrigerant system 34 may include a heat exchanger 100', such as a refrigerant-refrigerant heat exchanger for example, where heat recovery fluid from different portions of the heat recovery fluid flow path 42 are the first fluid and the second fluid within the heat exchanger 100'. In an embodiment, best shown in FIG. 3, a first portion of the heat exchanger 100' is positioned downstream from the ejector outlet 78 and upstream from the heat exchanger 84. As a result, the heat recovery fluid output from the ejector 72 functions as a first fluid within the first portion of the heat exchanger 100'. In such embodiments, the circuiting of the heat recovery fluid flow path 42 may be configured such that a second portion of the heat exchanger 100' configured to receive a second fluid is positioned between the pump 64 and the heat exchanger 70. Accordingly, the cool heat recovery fluid output from the pump 64 is provided to the heat exchanger 100'. Within the heat exchanger 100', the heat recovery fluid output from pump 64 absorbs heat from the heat recovery fluid output from the ejector 72 prior to being provided to the heat exchanger 70.

In some embodiments, as shown in FIG. 4, the refrigeration system 34 may include both the heat exchanger 100 and the heat exchanger 100'. Inclusion of both heat exchangers 100, 100' further increases the temperature of the heat recovery fluid used to recover the engine coolant within the heat exchanger 70. In the illustrated, non-limiting embodiment, the heat recovery fluid output from the pump 64 is first heated within heat exchanger 100' by heat recovery fluid output from the ejector 72 and is further heated within heat exchanger 100 by the refrigerant output from the compressor 44. However, it should be understood that embodiments where the heat recovery fluid to be provided to the heat exchanger 70 is first heated by heat exchanger 100 and further heated by heat exchanger 100' are also within the scope of the disclosure. In addition, although specific configurations of the refrigeration system 34 and the corresponding positions of the heat exchangers 100, 100' therein are illustrated and described herein, it should be understood that the heat exchanger may be arranged at any suitable location within the refrigeration system 34. More specifically, the heat exchangers 100, 100' may be located at any position where the fluid within either the vapor compression flow path 38 or the heat recovery flow path 42 has a temperature greater than at least one of an outside ambient temperature and a condensing temperature of the fluid (whichever is lowest).

A refrigeration system 34 as illustrated and described herein not only allows for waste heat at various external ambient conditions and load to be recovered, but also reduces the size of the condenser 50 or 84, the size of the generator heat exchanger 70 and the power required by the condenser fan 58 or 86.

The term "about" is intended to include the degree of error associated with measurement of the particular quantity based upon the equipment available at the time of filing the application.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A refrigerated system comprising:
   a vapor compression system defining a refrigerant flow path, the vapor compression system including a compressor and a condenser;
   a closed loop heat recovery system defining a heat recovery fluid flow path comprising a primary fluid loop and a secondary fluid loop, the heat recovery system being thermally coupled to the vapor compression system, wherein the heat recovery system includes:

a first heat exchanger within which heat is transferred between a heat recovery fluid and an engine coolant;

a subcooler positioned along the heat recovery fluid flow path, wherein the heat recovery system is thermally coupled to the vapor compression system at a location downstream from the condenser at the subcooler; and at least one recovery heat exchanger positioned along the heat recovery fluid flow path directly upstream from the first heat exchanger, wherein the heat recovery system is thermally coupled to the vapor compression system at the at least one recovery heat exchanger such that heat is transferred between the heat recovery fluid and the refrigerant within the at least one recovery heat exchanger;

wherein the first heat exchanger and the at least one recovery heat exchanger are positioned along the primary fluid loop and the subcooler is positioned along the secondary fluid loop.

2. The refrigerated system of claim 1, wherein the heat recovery system further comprises:

a pump located upstream from the first heat exchanger;

an ejector having a primary inlet and a secondary inlet; and a heat rejection heat exchanger arranged downstream from the ejector.

3. The refrigerated system of claim 2, wherein heat recovery fluid is provided to the at least one recovery heat exchanger from the pump.

4. The refrigerated system of claim 1, wherein the refrigerant of the vapor compression system provided to the at least one recovery heat exchanger has a temperature above an outside ambient temperature.

5. The refrigerated system of claim 4, wherein the refrigerant discharged from the compressor is provided to the at least one recovery heat exchanger.

6. The refrigerated system of claim 2, wherein a first portion of the heat recovery fluid output from the heat rejection heat exchanger is provided to the primary fluid loop and a second portion of the heat recovery fluid output from the heat rejection heat exchanger is provided to the secondary fluid loop.

7. The refrigerated system of claim 6, wherein the second portion of the heat recovery fluid is provided to the secondary inlet of the ejector.

8. The refrigerated system of claim 1, wherein the at least one recovery heat exchanger includes a first recovery heat exchanger and a second recovery heat exchanger arranged in series with respect to the heat recovery fluid flow path.

9. The refrigerated system of claim 1, wherein the refrigerated system is part of a refrigerated compartment of a refrigerated transport system, the refrigerated compartment being arranged in thermal communication with a second heat exchanger of the vapor compression system.

10. A method of operating a transport refrigeration system including a vapor compression system and a heat recovery system comprising:

circulating a refrigerant through a vapor compression flow path of the vapor compression system, the vapor compression system including a compressor and a condenser;

circulating a heat recovery fluid through a heat recovery fluid flow path of the heat recovery system, the heat recovery fluid flow path including a primary flow path and a secondary flow path, wherein, the heat recovery system includes a heat exchanger for transferring heat between the heat recovery fluid within the heat recovery fluid flow path and an engine coolant, the heat exchanger being arranged along the primary flow path; and transferring heat to the heat recovery fluid within the heat recovery fluid flow path from the refrigerant within a heat recovery heat exchanger arranged along the primary flow path the heat recovery heat exchanger being separate from the condenser and located directly upstream from the heat exchanger, the vapor compression system being thermally coupled to the heat recovery system at the heat recovery heat exchanger; and transferring heat to the heat recovery fluid within the heat recovery fluid flow path from the refrigerant within a subcooler arranged along the secondary flow path, the subcooler being located downstream from the condenser relative to the vapor compression flow path.

11. The method of claim 10, further comprising transferring heat to the heat recovery fluid within the heat recovery fluid flow path at a second location upstream from the heat exchanger and the heat recovery heat exchanger.

12. The method of claim 11, wherein the heat recovery fluid received heat from a secondary fluid within an another heat recovery heat exchanger.

13. The method of claim 12, wherein the secondary fluid is the heat recovery fluid from another portion of the heat recovery fluid within the heat recovery fluid flow path.

14. The method of claim 13, wherein the secondary fluid is the heat recovery fluid at an outlet of an ejector of the heat recovery system.

15. A refrigerated system comprising:

a vapor compression system defining a refrigerant flow path, the vapor compression system including a compressor and a condenser;

a closed loop heat recovery system defining a heat recovery fluid flow path comprising a primary fluid loop and a secondary fluid loop, the heat recovery system including:

a first heat exchanger within which heat is transferred between a heat recovery fluid and an engine coolant;

a subcooler positioned along the heat recovery fluid flow path, wherein the heat recovery system is thermally coupled to the vapor compression system at a location downstream from the condenser at the subcooler; and at least one recovery heat exchanger positioned along the heat recovery fluid flow path upstream from the first heat exchanger wherein the heat recovery system is thermally coupled to the vapor compression system at the at least one recovery heat exchanger such that heat is transferred between the heat recovery fluid and the refrigerant within the at least one recovery heat exchanger, the at least one recovery heat exchanger arranged downstream from an outlet of the compressor and upstream from an inlet of the condenser;

wherein the first heat exchanger and the at least one recovery heat exchanger are positioned along the primary fluid loop and the subcooler is positioned along the secondary fluid loop.

* * * * *